US012663551B2

(12) United States Patent　　(10) Patent No.:　US 12,663,551 B2
Oelsner　　(45) Date of Patent:　Jun. 23, 2026

(54) METHOD FOR DETERMINATION OF ACTINIUM-227 IN ACTINIUM-225

(71) Applicant: BWXT Medical Ltd., Ottawa (CA)

(72) Inventor: Stephen M. Oelsner, Carleton Place (CA)

(73) Assignee: BWXT Medical Ltd., Ottawa (CA)

( * ) Notice: Subject to any disclaimer, the term of this patent is extended or adjusted under 35 U.S.C. 154(b) by 89 days.

(21) Appl. No.: 18/397,165

(22) Filed: Dec. 27, 2023

(65) Prior Publication Data

US 2024/0219592 A1　　Jul. 4, 2024

Related U.S. Application Data

(60) Provisional application No. 63/435,881, filed on Dec. 29, 2022.

(51) Int. Cl.
　　*G01T 1/36*　　　　(2006.01)
(52) U.S. Cl.
　　CPC ....................................... *G01T 1/36* (2013.01)
(58) Field of Classification Search
　　CPC ....................................................... G01T 1/36
　　See application file for complete search history.

(56) References Cited

U.S. PATENT DOCUMENTS

| | | | |
|---|---|---|---|
| 5,809,394 A * | 9/1998 | Bray | C22B 60/0295 |
| | | | 423/6 |
| 12,002,596 B2 * | 6/2024 | Czerwinski | G21C 19/42 |
| 2006/0153760 A1 * | 7/2006 | Meikrantz | C22B 30/06 |
| | | | 423/8 |
| 2015/0292061 A1 | 10/2015 | Fassbender et al. | |
| 2016/0209387 A1 | 7/2016 | Hjellum | |
| 2017/0202983 A1 * | 7/2017 | Birnbaum | A61K 51/00 |

| | | | |
|---|---|---|---|
| 2018/0180585 A1 * | 6/2018 | Hjellum | C01F 13/00 |
| 2021/0027905 A1 * | 1/2021 | Robertson | B01D 15/1871 |
| 2022/0200522 A1 | 6/2022 | de Fresart et al. | |
| 2022/0215979 A1 * | 7/2022 | Kim | G21G 1/001 |
| 2024/0221968 A1 | 7/2024 | Causey et al. | |
| 2025/0218616 A1 | 7/2025 | Tamboline et al. | |

FOREIGN PATENT DOCUMENTS

| | | |
|---|---|---|
| CA | 3192521 A1 | 3/2022 |
| WO | 2022/183204 A1 | 9/2022 |

OTHER PUBLICATIONS

International Search Report and Written Opinion, PCT/IB2023/000799, dated Aug. 2, 2024, 10 pages.
International Preliminary Report on Patentability, PCT/IB2023/000799, dated Jul. 1, 2025, 6 pages.
International Search Report and Written Opinion, PCT/IB2023/000800, dated Jun. 7, 2024, 10 pages.
International Search Report and Written Opinion, PCT/US2023/035301, dated Feb. 21, 2024, 10 pages.
Mastren, T. et. al., "Simultaneous Separation of Actinium and Radium Isotopes from a Proton Irradiated Thorium Matrix," Scientific Reports, vol. 7 (1):8216 (2017).
McAlister, D. et al., "Selective separation of radium and actinium from bulk thorium target material on strong acid cation exchange resin from sulfate media," Applied Radiation and Isotopes, vol. 140: 18-23 (2018).
Robertson, A. et. al. "232Th-Spallation-Produced 225Ac with Reduced 227Ac Content," Inorganic Chemistry, vol. 59 (17):12156-65 (Abstract only) (2020).

* cited by examiner

*Primary Examiner* — Hugh Maupin
(74) *Attorney, Agent, or Firm* — Nelson Mullins Riley & Scarborough LLP

(57) ABSTRACT

A method for determination of Actinium-227 (Ac-227) via indirectly produced Ra-225/Ac-225 parent/daughter. The determination of Ac-227 or its decay daughters can be used as a "pre-release" quality control test for total Ac-227 content.

4 Claims, 2 Drawing Sheets

PRIOR ART

PRIOR ART

Ac-227 decay scheme

METHOD FOR DETERMINATION OF ACTINIUM-227 IN ACTINIUM-225

CROSS-REFERENCE TO RELATED APPLICATION

This application claims priority from U.S. Provisional Patent Application No. 64/435,881 filed on Dec. 29, 2022, in the United States Patent and Trademark Office. The disclosure of which is incorporated herein by reference in its entirety.

FIELD OF THE INVENTION

The present invention relates to a method of determining Actinium-227 (Ac-227) in Actinium-225 (Ac-225), more particularly to a method for determination of Ac-227 in Ac-225 via an indirectly produced Ra-225/Ac-225 parent/daughter.

BACKGROUND OF THE INVENTION

Actinium-225 (Ac-225) is an isotope of actinium and an alpha emitting actinide that has a great deal of interest from a therapeutic active pharmaceutical ingredient (API) standpoint. Ac-225 is created by isolation from legacy materials (uranium) or by proton bombardment of Thorium (Th). Proton bombardment of Th-232 produces multiple radionuclidic species including Ra-225, Ac-225 and Ac-227.

There are two known methods to obtain Ac-225 from this irradiation—direct and indirect. In the direct method, all actinium is isolated from the rest of the radionuclides. This concentrates both the Ac-225 and Ac-227 together (chemically non-separable) and produces an Ac-225 product that is significantly contaminated with Ac-227 and less desirable.

In the indirect method, the parent isotope of Ac-225, which is radium-225, is isolated and purified. While this indirect method produces lower quantities of the Ac-225, it has a much lower concentration of Ac-227 and is therefore safer for patients.

FIG. 1 is an illustration of a known Ra-225/Ac-225 decay scheme. FIG. 2 is an illustration of a known Ac-227 decay scheme.

However, there are disadvantages with the known methods to obtain the Ac-227 impurity level in Ac-225. For example, measurement of Ac-227 is conducted months after the Ra-225/Ac-225 batch was created due to interferences of the many decay products of the Ac-225. This post "release" quality control (QC) measurement, while accurate, is not as desirable particularly because of patient safety considerations as Ac-227 is a highly toxic alpha emitter.

Furthermore, it would be preferable if the Ac-227 impurity would be quantified by a technique with an ion counting technique such as inductively coupled plasma mass spectrometry (ICP-MS). However, the mass range 211-229 is devoid of ICP-MS standards with naturally occurring elements and consequently makes quantifying Ac-227 in anything other than a semi-quantitative mode a challenge.

Thus, there is a need for an alternative method of determining Actinium-227 (Ac-227) in Actinium-225 (Ac-225) that overcomes the disadvantages of the known methods. The method of the present invention overcomes these disadvantages.

SUMMARY OF THE INVENTION

The method of the present invention is used for determination of Actinium-227 (Ac-227) via indirectly produced Ra-225/Ac-225 parent/daughter. The determination of Ac-227 or its decay daughters can be used as a pre-release quality control test for total Ac-227 content. Pre-release generally refers to a quality control procedure being conducted against drug product specifications and with results approved prior to batch release and/or patient use.

Measurement of Th-227, one of the Ac-227 daughter products, is possible due to the ability to chemically separate thorium from radium and actinium and other radionuclides. Therefore, in accordance with the method of the present invention, measurement of Ac-227 in Ac-225 solutions is based upon the decay of Ac-227 to Th-227.

The advantage of this invention is that it provides a value for Ac-227 in the Ac-225 batch at time-of-release of the Ac-225 batch thereby giving confidence for the API in terms of patient safety. This is an improvement over post release testing and potentially discovering an issue after patient use of the API.

The commercial value is considerable if one considers the consequences of using Ac-225 in a patient if a high Ac-227 burden is discovered post release and post use. This would also be valuable to any commercial production of Ac-225 from a Ra-225 stock for its entire lifetime (Ra-225 stocks are "milked" for Ac-225 multiple times).

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein.

DESCRIPTION OF THE PREFERRED EMBODIMENTS

Figure 1:
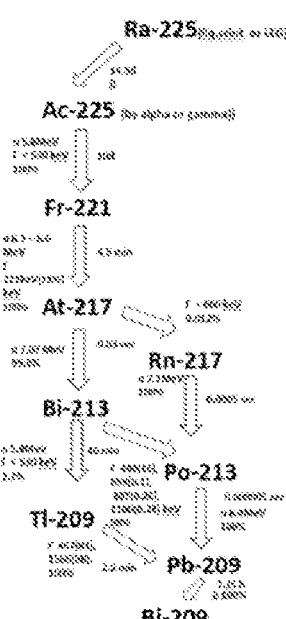
FIG. 1 is an illustration of a known Ra-225/Ac-225 decay scheme.
Figure 2:
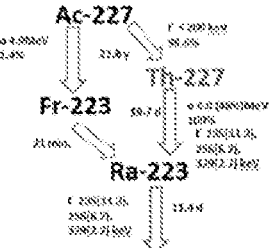
FIG. 2 is an illustration of a known Ac-227 decay scheme.

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

The method of the present invention is a timely pre-release method for determining Actinium-227 (Ac-227) impurity in Actinium-225 (Ac-225) from indirect Ra-225.

Ra-225 is initially purified to a high degree from any actinium isotopes (and other interfering radionuclides). The entire Ra-225 stock is sampled post purification providing lower levels of detection/quantification of Ac-227/Th-227. At the end of the Ra-225 purification, since no additional Ac-227 is being created, the Ra-225 stock is sampled immediately post Purification (for future Th-227 determination). The desired Ac-225 "grows-in" from Ra-225 for (nominally) 7 days prior to extraction of Ac-225. The Ac-227 method includes several chemical separation steps.

Thus, the method of the present invention generally comprises providing a purified Ra-225 stock and sampling the purified Ra-225 stock to determine Ac-225 and/or Ac-228 content by alpha or gamma spectroscopy. In the purified Ra-225 stock, impurities have been removed and any Ac-227 impurity remaining does not change significantly with respect to the 14 day half-life of Ra-225 due to the Ac-227 half-life of 23 years.

The method further comprises extracting of all actinium isotopes from the Ra-225 stock. The first actinium extraction Ac-225/227/228 is referred to herein as "Stock A." A value for the actinium-225 or -228 (mCi or Ci) extracted and a value for the actinium-225 or -228 (mCi or Ci) in the original Ra-225 stock is used to calculate an Efficiency Fraction A:

$$(\text{Actinium extracted})/(\text{Actinium in original } Ra-225 \text{ stock}) =$$

$$\text{Efficiency Fraction } A$$

For example:

$$(mCi\,Ac-225 \text{ extracted}/mCi\,Ac-225 \text{ in original } Ra-225 \text{ stock}) =$$

$$\text{fraction recovered}$$

$$\text{fraction recovered} \times 100 = \text{percent recovery by alpha spectroscopy}$$

The method further comprises resting Stock A for at least 5 days to allow the Ac-227 to decay to Th-227. The Th-227 will build up over this period of time and a percentage saturation factor is calculated using the following equation:

$$\left(1 - e^{\left(-LN2 \times time/half-life\right)}\right) = \text{saturation factor}$$

$$1 - e^{\left(-0.69315 \times 5d/18.7d\right)} = 0.17 \text{ fraction}$$

$$0.17 \text{ fraction recovered} \times 100 =$$

$$17\% \text{ saturation factor percentage (for 5 days)}$$

Note that 18.7d is half-life of Th-227.

Rest time can vary to produce different saturation values.

The method further comprises adding a Th-230 tracer to Stock A. This allows subsequent calculation of Thorium recoveries by adding a known amount of tracer. Thorium tracers that may be employed include, but are not limited to, Th-228, Th-229, Th-230, Th-231, Th-232, Th-234, and a combination(s) thereof.

The method further comprises chemically isolating (i.e. chromatography) Thorium (227 and 230) from all other impurities including actinium.

The method further comprises mounting the Thorium isotopes onto an alpha counting disc using alpha spectroscopy preparation methods.

The method further comprises counting the alpha disc using alpha spectroscopy counting equipment to determine Th-227 quantity and Th-230 recovery % as follows:

$$Th-230 \text{ recovered}/Th-230 \text{ added} = \text{Efficiency Fraction } B$$

The method further comprises determining the amount of Ac-227 in Stock A by using the counts in a calculation as follows:

$$Bq \text{ (Bequerels) of } Ac-227 \text{ in Stock } A =$$

$$\frac{(\text{counts in } Th-227 \text{ region})}{(\text{Efficiency Fraction } A)(\text{Efficiency Fraction } B)}$$
$$(\text{alpha counting geometry efficiency}^*)(\text{saturation factor})$$

$$^*\text{Note: approximate 20\% counting efficiency}$$

$$(\text{combination geometry/scatter})$$

In an aspect of the present invention, the method for determination of Ac-227 in Ac-225 comprises:

providing a purified Ra-225 stock, obtaining Ra-225 and Ac-225 (or Ac-228) activity in the purified Ra-225 stock, (For example, Ra-225 by sampling and Liquid Scintillation (LS)/Low Energy Gamma (LEG) or whole stock by LEG, Ac-225 (or Ac-228) by sampling alpha or gamma spectroscopy; Note that Ra-225 value may not be required for this calculation).

performing Ac-225/228 extraction to make a Stock A and conducting spectroscopy (by alpha spectroscopy) (referred to herein as "Stock A"), comparing Ac-225/228 before and after extraction to obtain a percentage Ac-225 recovery (referred to herein as "efficiency A" such as 90%), allowing Stock A to start to saturate (for example, 10% to 23% saturation for Th-227), adding a Th tracer (Th-230 or Th-232 if freshly purified), if none is there in the first place, to Stock A, mixing and/or separating Th from Ac mixture using chromatography (for example, AG1×8 @8N $HNO_3$), (Note Th-230 alpha is at 4.6 MeV which is significantly different than Th-227 at approximately 6 MeV (48%) which makes them distinguishable and measurable).

stripping Th from column (Th purification may be repeated if required) and evaporate to dryness, bringing Th back into solution with 1 mL IN $HNO_3$, adding 0.5 mL aliquots to SS planchet with evaporations plus additional 0.5 mL rinsing of beaker, optionally flame sealing the SS planchet, counting the SS planchet by Alpha spectroscopy for Th-227 and Th-230 (Recovery of Th-230 is the Th recovery "efficiency B")

Note that approximate 20% counting efficiency (combination geometry/scatter).

PROPHETIC EXAMPLE

Typically, Limit of Detection (LOD) for alpha counts is approximately 50 counts/180 minutes. Therefore, the LOD in this case is $50/(0.2 \times 0.17 \times 0.9 \times 0.9 \times 180)=10.1$ Bq, So if the extracted Ac-225 stock 7 days post Stock A creation is 2 mCi then, $10.1Bq/(0.2 \times 3.7 \times 10^7 \text{ Bq/mCi}) \times 100\%=1.4 \times 10^{-5}\%$ nominal LOD Ac-227/Ac-225. This is the worst case for the Ra-225 stock LOD value which could be lowered by longer counting time, more Ac-225 activity, Th-227 saturation.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A method for determination of Ac-227 in Ac-225, the method comprising:

measuring Ac-227 in Ac-225 via an indirectly produced Ra-225/Ac-225 parent/daughter.

2. A method for determination of Ac-227 in Ac-225, the method comprising:

providing a purified Ra-225 stock, sampling the purified Ra-225 stock to determine Ac-225 and/or Ac-228 content;

extracting of actinium isotopes from the Ra-225 stock to generate a Stock A;

resting Stock A to allow the Ac-227 to decay to Th-227;

adding a Thorium tracer to Stock A;

chemically isolating Th-227 and the Thorium tracer from other impurities including actinium;

mounting thorium isotopes onto an alpha counting disc;

counting the alpha disc using alpha spectroscopy counting equipment to determine Th-227 quantity and tracer recovery %; and determining an amount of Ac-227 in Stock A by using the counts.

3. The method according to claim 2, wherein the Thorium tracer is selected from the group consisting of Th-228, Th-229, Th-230, Th-231, Th-232, Th-234, and a combination thereof.

4. A method for determination of Ac-227 in Ac-225, the method comprising:

providing a purified Ra-225 stock, sampling the purified Ra-225 stock to determine Ac-225 and/or Ac-228 content;

extracting of actinium isotopes from the Ra-225 stock to generate a Stock A;

resting Stock A to allow the Ac-227 to decay to Th-227;

adding a Th-230 tracer to Stock A;

chemically isolating Th-227 and Th-230 from other impurities including actinium;

mounting thorium isotopes onto an alpha counting disc;

counting the alpha disc using alpha spectroscopy counting equipment to determine Th-227 quantity and Th-230 recovery %; and determining an amount of Ac-227 in Stock A by using the counts.

* * * * *